United States Patent
Ohishi

(10) Patent No.: US 10,364,343 B2
(45) Date of Patent: Jul. 30, 2019

(54) RUBBER COMPOSITION FOR VIBRATION PROOF RUBBERS

(71) Applicant: TOYO TIRE & RUBBER CO., LTD., Itami-shi, Hyogo (JP)

(72) Inventor: Akira Ohishi, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/667,098

(22) Filed: Aug. 2, 2017

(65) Prior Publication Data

US 2018/0142086 A1    May 24, 2018

(30) Foreign Application Priority Data

Nov. 22, 2016   (JP) ................... 2016-226848

(51) Int. Cl.
| | |
|---|---|
| *C08L 9/00* | (2006.01) |
| *C08L 7/00* | (2006.01) |
| *C08L 25/02* | (2006.01) |
| *C08K 3/06* | (2006.01) |
| *C08K 3/22* | (2006.01) |
| *F16F 15/08* | (2006.01) |

(52) U.S. Cl.
CPC ............. *C08L 9/00* (2013.01); *C08K 3/06* (2013.01); *C08K 3/22* (2013.01); *C08L 7/00* (2013.01); *C08L 25/02* (2013.01); *F16F 15/08* (2013.01); *C08K 2003/2296* (2013.01)

(58) Field of Classification Search
CPC ... C09L 9/00; C09L 25/02; C09L 7/00; C09K 3/06; C09K 3/22; C09K 2003/2296; F16F 15/08
See application file for complete search history.

(56) References Cited

FOREIGN PATENT DOCUMENTS

| JP | 2006-193621 A | | 7/2006 | |
| JP | 2014-077050 A | * | 5/2014 | ............... C08L 7/00 |
| JP | 2014-77050 A | | 5/2014 | |
| JP | 2016-138179 A | * | 8/2016 | ............. C08L 21/00 |

* cited by examiner

*Primary Examiner* — Robert D. Harlan
(74) *Attorney, Agent, or Firm* — Westerman, Hattori, Daniels & Adrian, LLP

(57) ABSTRACT

A rubber composition for vibration proof rubbers comprises a rubber component comprising one or more diene based rubbers, a multiple zinc flower, and a mixed resin. The mixed resin comprises an aromatic hydrocarbon resin and an aliphatic hydrocarbon resin. The rubber composition for vibration proof rubbers preferably comprises the multiple zinc flower in an amount of 2 to 40 parts by weight for 100 parts by weight of the rubber component, and the mixed resin in an amount of 0.5 to 5 parts by weight therefor.

3 Claims, No Drawings

RUBBER COMPOSITION FOR VIBRATION PROOF RUBBERS

BACKGROUND OF THE INVENTION

Field of the Invention

The present invention relates to a rubber composition for vibration proof rubbers, and particularly to a rubber composition for vibration proof rubbers that is usable suitably for vibration proof members such as an engine mount for automobiles, and a vibration proof rubber using this composition.

Description of the Related Art

As a vibration proof rubber, a composition has been hitherto used in which carbon black as a reinforcing material is blended into natural rubber. In recent years, the market has been requiring vibration proof rubbers, particularly, vibration proof rubbers for automobiles to be decreased in dynamic magnification ("dynamic spring constant"/"static spring constant" ratio).

In order to make vibration proof rubbers lower in dynamic magnification, it is important to heighten the dispersibility of carbon black in their natural rubber. Hitherto, a method has been adopted in which as the species of carbon black, a species large in particle diameter is used to heighten the dispersibility of carbon black in natural rubber. However, this method tends to damage the endurance of vibration proof rubbers.

Apart from the above, in a rubber composition, a vulcanization promoter is generally used together with a sulfur-containing vulcanizer to shorten the vulcanizing period of the composition, lower the vulcanizing temperature thereof and decrease the amount of the vulcanizer. A substance for activating this vulcanization promoter to heighten a vulcanization-promoting effect thereof further is a metal oxide, atypical example thereof being zinc oxide (zinc flower). Patent Document 1 listed below states that a vibration proof rubber decreased in dynamic magnification can be obtained by vulcanizing a rubber composition in which zinc flower made into fine particles is blended into natural rubber in a specific amount for 100 parts by weight of the natural rubber. However, the inventors have made eager investigations to find out that in the technique described in this patent document, there remains a room for a further improvement from the viewpoint of a decrease of the vibration proof rubber in dynamic magnification.

Vibration proof rubbers, particularly, for automobiles may be intensely required to be decreased in dynamic magnification and be further improved in heat resistance. Patent Document 2 listed below discloses a technique of blending 3 to 50 parts by weight of a multiple zinc flower into 100 parts by weight of a diene based rubber in a rubber composition to decrease the resultant vibration proof rubber in dynamic magnification. However, the inventors have made eager investigations to find out that there remains a room for a further improvement from the viewpoint of an improvement of the vibration proof rubber in heat resistance.

Patent Document 3 listed below describes a technique of blending a mixed resin into a rubber composition to aim to provide a rubber composition for vibration proof rubbers that is able to restrain the vibration proof rubbers from being changed, with time, in dynamic spring constant in a region of very low temperatures. However, the invention described in this document is an invention for solving a problem in an especial situation such as a very low temperature situation. Thus, the document neither discloses nor suggests that the invention aims to decrease the resultant vibration proof rubber in dynamic magnification.

PRIOR ART DOCUMENTS

Patent Documents

Patent Document 1: JP-A-2006-193621
Patent Document 2: JP-A-2014-77050
Patent Document 3: JP-A-2016-138179

SUMMARY OF THE INVENTION

In the light of the above-mentioned actual situation, the present invention has been made, and an object thereof is to provide a rubber composition for vibration proof rubbers that can satisfy compatibility between being decreased in dynamic magnification and being improved in working stability.

In order to solve the above-mentioned problem, the inventors have made eager investigations about combinations each composed of a metal oxide and a mixed resin. As a result, the inventors have found out that using, as raw material, a rubber composition in which a combination of a multiple zinc flower with a mixed resin is blended into a diene based rubber, a vibration proof rubber can be obtained which is remarkably decreased in dynamic magnification, is prevented from being scorched, and is excellent in working stability. The present invention has been made as a result of the investigations, and the invention can attain the above-mentioned object.

The invention is a rubber composition for vibration proof rubbers, including a rubber component including one or more diene based rubbers, a multiple zinc flower, and a mixed resin, wherein the mixed resin includes an aromatic hydrocarbon resin and an aliphatic hydrocarbon resin. In the rubber composition of the present invention for vibration proof rubbers, a combination of the multiple zinc flower with the mixed resin is blended into the diene based rubber; thus, a vibration proof rubber produced using this blend as raw material can be remarkably decreased in dynamic magnification, prevented from being scorched, and improved, particularly, in working stability. A reason why the advantageous effects can be gained is unclear. However, the reason would be in that the multiple zinc flower and the mixed rubber affect crosslinking reaction of the rubber component so that the resultant vibration proof rubber can attain a decrease in dynamic magnification and an improvement in working stability with a good balance. In order that the produced vibration proof rubber can attain the decrease in dynamic magnification and the improvement in working stability with a better balance, the rubber composition preferably includes the multiple zinc flower in an amount of 2 to 40 parts by weight and the mixed resin in an amount of 0.5 to 5 parts by weight for 100 parts by weight of the rubber component.

Preferably, the rubber composition for vibration proof rubbers further includes sulfur. More preferably, the composition includes sulfur in an amount less than 1.5 parts by weight for 100 parts by weight of the rubber component. When a combination of the multiple zinc flower and the mixed resin with sulfur is blended into the diene based rubber and, in particular, the blend ratio between the three is set into a ratio in the specific range, the produced vibration proof rubber can attain the decrease in dynamic magnification and the improvement in working stability with an especially good balance.

DETAILED DESCRIPTION OF THE PREFERRED EMBODIMENTS

The rubber composition according to the present invention for vibration proof rubbers includes a rubber component including one or more diene based rubbers, a multiple zinc flower, and a mixed resin.

The rubber composition according to the present invention for vibration proof rubbers includes one or more diene based rubbers as a rubber component, and preferably includes one or more diene based rubbers as one or more main rubbers of the rubber component. In the present invention, the wording "includes one or more diene based rubbers as one or more main rubbers of the rubber component" means that as one or more rubbers included in the rubber component, the diene based rubber(s) is/are included in an amount that is 50 parts or more by weight, preferably 80 parts or more by weight, even more preferably 95 parts or more by weight. Examples of the one or more diene based rubbers include natural rubber (NR); synthetic diene based rubbers such as isoprene rubber (IR), butadiene rubber (BR), styrene butadiene rubber (SBR), butyl rubber (IIR), and acrylonitrile butadiene rubber (NBR); halogenated butyl rubbers such as brominated butyl rubber (BR-IIR); other synthetic rubbers such as polyurethane rubber, acrylic rubber, fluorine-contained rubber, silicone rubber, and chlorosulfonated polyethylene.

The rubber composition according to the present invention for vibration proof rubbers includes a multiple zinc flower. The multiple zinc flower is included in an amount preferably from 2 to 40 parts by weight, preferably from 2 to 20 parts by weight for 100 parts by weight of the rubber component. The multiple zinc flower has a structure in which the outer surface of a core as a carrier into rubber is coated with a zinc flower higher in activity than any ordinary zinc flower. The core is made of, for example, $CaCO_3$, $Ca(OH)_2$, $CaSO_4$, $ZnO$, $MgO$, $Mg(OH)_2$, or $MgCO_3$. The ratio between the size of the core and the thickness of the coat layer of the higher-activity zinc flower, and other factors of the multiple zinc flower may be set at will. As the multiple zinc flower, any commercially available product thereof is preferably usable. Examples thereof include products of a META-Z L series (META-Z L40, L50 and L60) manufactured by Inoue Calcium Corp.

In the rubber composition according to the present invention for vibration proof rubbers, the resin included together with the multiple zinc flower is a mixed resin including at least an aromatic hydrocarbon resin and an aliphatic hydrocarbon resin. In this mixed resin, the aromatic hydrocarbon resin is, for example, phenolic adhesive resin, coumarone resin, indene resin, or indene-coumarone resin; and the aliphatic hydrocarbon resin is, for example, C5, C8 or C9 aliphatic hydrocarbon resin. The mixed resin may optionally include any other resin known by those skilled in the art, such as xylene resin, phenolic resin, terpene resin or ketone resin. The content of the mixed resin in the composition is preferably from 0.5 to 5 parts by weight, more preferably from 2 to 4 parts by weight for 100 parts by weight of the rubber component from the viewpoint of an effective restraining of the vibration proof rubbers from being changed, with time, in dynamic spring constant in a region of very low temperatures.

The rubber composition according to the present invention for vibration proof rubbers preferably includes a sulfur-containing vulcanizer. The species of sulfur in the sulfur-containing vulcanizer may be of any ordinary sulfur species for rubbers. Examples thereof include powdery sulfur, precipitated sulfur, insoluble sulfur, and highly dispersible sulfur. The sulfur content in the rubber composition according to the present invention for vibration proof rubbers is preferably less than 1.5 parts by weight for 100 parts by weight of the rubber component. When the dynamic magnification and the heat resistance of the produced vibration proof rubber are considered, the sulfur content is preferably from 0.05 to 0.1 part (both inclusive) by weight, in particular preferably 0.05 part or more by weight, and less than 0.5 part by weight.

Together with the above-mentioned rubber component, multiple zinc flower, mixed resin and sulfur-containing vulcanizer, blending agents used ordinarily in the rubber industry may be appropriately used and blended into the rubber composition of the present invention for vibration proof rubbers as far as the advantageous effects of the invention are not damaged. Examples thereof include a vulcanization promoter, carbon black, silica, a silane coupling agent, stearic acid, a vulcanization promotion aid, a vulcanization retarder, an antiaging agent, softeners such as wax and oil, and a working aid.

The species of the carbon black may be, for example, SAF, ISAF, HAF, FEF or GPF. The carbon black is usable as far as the carbon black can adjust rubber properties of the vulcanized rubber, such as the hardness, reinforcing performance, and low exothermic property of the rubber. The carbon black blend amount is preferably from 20 to 120 parts by weight, more preferably from 30 to 100 parts by weight, even more preferably from 30 to 60 parts by weight for 100 parts by weight of the rubber component. If this blend amount is less than 20 parts by weight, the rubber composition cannot gain the reinforcing effect of the carbon black sufficiently. If the blend amount is more than 120 parts by weight, the rubber composition may be deteriorated in exothermic property, rubber miscibility, workability when worked, and others.

The vulcanization promoter may be a vulcanization promoter used usually for rubber vulcanization. Examples thereof include sulfenamide type, thiuram type, thiazole type, thiourea type, guanidine type, dithiocarbamic acid salt type vulcanization promoters. These promoters may be used singly or in an appropriate mixture form.

The antiaging agent maybe an antiaging agent used usually for rubbers. Examples thereof include aromatic amine type, amine-ketone type, monophenolic type, bisphenolic type, polyphenolic type, dithiocarbamic acid salt type, and thiourea type antiaging agents. These agents may be used singly or in an appropriate mixture form.

The rubber composition of the present invention for vibration proof rubbers can be obtained by kneading the above-mentioned rubber component, multiple zinc flower, mixed resin and sulfur-containing vulcanizer, and optional components, which are, for example, carbon black, stearic acid, a vulcanization promoter, an antiaging agent, and wax, using a kneading machine used in an ordinary rubber industry, such as a Banbury mixer, a kneader, or a roller.

The method for blending these individual components with each other is not particularly limited, and may be, for example, any one of the following: a method of kneading, in advance, blending components other than the sulfur-containing vulcanizer, the vulcanization promoter and other vulcanization-related blending components to prepare a masterbatch, adding the remaining components thereto, and further kneading these components; a method of adding the individual components in any order to a kneading machine and then kneading the components; and a method of adding all the components simultaneously to the same machine, and then kneading the components.

The individual components are kneaded, worked and shaped, and then the shaped body is vulcanized. In this way, a vibration proof rubber can be produced with a low dynamic magnification. This vibration proof rubber is usable suitably for vibration proof rubbers for automobiles, for example, for their engine mounts, torsional dampers, body mounts, member mounts, strut mounts and muffler mounts, and suitably for vibration proof rubbers for railway vehicles and vibration proof rubbers for industrial machines. The vibration proof rubber is particularly useful as a constituent member of vibration proof rubbers for automobiles, e.g., for their engine mounts, which are required to have heat resistance and a low dynamic magnification.

EXAMPLES

Hereinafter, this invention will be more specifically described by way of working examples thereof.
(Rubber Composition Preparation)
In accordance with a blend formulation in Table 1, components for each of Examples 1 to 5 and Comparative Examples 1 and 2 were blended into 100 parts by weight of a rubber component. An ordinary Banbury mixer was used to knead the blended components to prepare a rubber composition. The blended components described in Table 1 are as follows:
a) Rubbers included in rubber component:
 natural rubber (NR): trade name "RSS#3";
 isoprene rubber (IR): trade name "IR2200" (manufactured by JSR Corp.), and
 butadiene (BR) rubber: trade name "BR01" (manufactured by JSR Corp.);
b) Multiple zinc flower: trade name "META-Z L60" (manufactured by Inoue Calcium Corp.), and
 zinc oxide: "No. 3 ZnO" (manufactured by Mitsui Mining & Smelting Co., Ltd.);
c) Stearic acid (manufactured by NOF Corp.);
d) Carbon black: trade name "SEAST V" (manufactured by Tokai Carbon Co., Ltd.);
e) Antiaging agent: trade name "NOCCLAC 6C" (manufactured by Ouchi Shinko Chemical Industrial Co., Ltd.)
f) Aroma oil: trade name "PROCESS X-140" (manufactured by Japan Energy Corp.);
g) Sulfur: 5%-oil-treated sulfur
h) Vulcanization promoters:
 (A) sulfenamide type vulcanization promoter: N-cyclohexyl-2-benzothiazolyl sulfenamide, trade name "NOCCELER CZ" (manufactured by Ouchi Shinko Chemical Industrial Co., Ltd.),
 (B) thiuram compound: tetramethylthiuram monosulfide, trade name "NOCCELER TS" (manufactured by Ouchi Shinko Chemical Industrial Co., Ltd.), and
 (C) thiuram compound: tetramethylthiuram disulfide, trade name "NOCCELER TT" (manufactured by Ouchi Shinko Chemical Industrial Co., Ltd.)

(i) Mixed resin including at least an aromatic hydrocarbon resin and an aliphatic hydrocarbon resin:
 (A) trade name "STRUKTOL HP-55", manufactured by Struktol AG, and
 (B) trade name "STRUKTOL 40 MS FLAKES", manufactured by Struktol AG.
(Evaluations)
A predetermined mold was used to heat and vulcanize each of the rubber compositions at 170° C. for 20 minutes to yield a vulcanized rubber. The rubber was evaluated.
<Dynamic Magnification>
(Static Spring Constant (Ks))
A sample of the vulcanized rubber was produced, which was produced by pressing the rubber composition into a columnar shape (diameter: 50 mm; and height: 25 mm) while vulcanizing the rubber composition. Thereafter, an adhesive agent was used to bond paired columnar tools (diameter: 60 mm; and height: 6 mm), respectively, to upper and lower surfaces of the vulcanized rubber sample to produce a test piece. The produced test piece was compressed two times by 7 mm in the columnar axis direction thereof. Subsequently, from a load deflection curve obtained when the strain of the piece was restored, the load giving a deflection of 1.5 mm and that giving a deflection of 3.5 mm were measured. Form these values, the static spring constant (Ks) (N/mm) was calculated out.
(Dynamic Spring Constant (Kd))
The test piece used when the static spring constant (Ks) was measured was compressed by 2.5 mm in the columnar axis direction. Constant-displacement harmonically compressing vibrations with an amplitude of 0.05 mm were applied to the test piece from below this piece at a frequency of 100 Hz, this 2.5-mm-compressed position being set to the center of the vibrations. Through a load cell positioned above the piece, a dynamic load to the piece was detected. In accordance with JIS-K 6394, the dynamic spring constant (Kd) (N/mm) of the piece was calculated.
(Dynamic Magnification: Kd/Ks ratio)
The dynamic magnification of the test piece was calculated out in accordance with the following equation:

Dynamic magnification="dynamic spring constant $(Kd)$"/"static spring constant $(Ks)$"

On the basis of the calculated dynamic spring constant (Kd) and static spring constant (Ks), the dynamic magnification was calculated. A target value of the dynamic magnification was set to 1.6 or less. When any one of the examples attained this target value, the example was judged to be good (circular mark), or when the example failed to attain this target value, the example was judged to be bad (cross mark). The evaluation results are shown in Table 1.
<Working Stability>
In accordance with JIS K 6300, the scorch time t5 (minutes) of the test piece was measured at 125° C. About the working stability of the test piece rubber, a target value of the t5 (minutes) was set to 14 minutes or more. When any one of the examples attained this target value, the example was judged to be good (circular mark), or when the example failed to attain this target value, the example was judged to be bad (cross mark). The evaluation results are shown in Table 1.

TABLE 1

|  |  | Comparative Example 1 | Comparative Example 2 | Example 1 | Example 2 | Example 3 | Example 4 | Example 5 |
|---|---|---|---|---|---|---|---|---|
| Blend | Carbon black | 40 | 40 | 40 | 40 | 40 | 40 | 40 |
|  | Aroma oil | 10 | 10 | 10 | 10 | 10 | 10 | 10 |
|  | Stearic acid | 1 | 1 | 1 | 1 | 1 | 1 | 1 |
|  | Antiaging agent | 1 | 1 | 1 | 1 | 1 | 1 | 1 |
|  | Sulfenamide type vulcanization promoter (A) | 2 | 2 | 2 | 2 | 2 | 2 | 2 |
|  | Thiuram type vulcanization promoter (B) | 0.5 |  | 0.5 | 0.5 | 0.5 |  | 0.5 |
|  | Thiuram type vulcanization promoter (C) |  | 0.5 |  |  |  | 0.5 |  |
|  | NR | 40 | 40 | 40 | 40 | 40 | 40 | 40 |
|  | IR | 40 | 40 | 40 | 40 | 40 | 40 | 40 |
|  | BR | 20 | 20 | 20 | 20 | 20 | 20 | 20 |
|  | Zinc oxide | 10 |  |  |  |  |  |  |
|  | Multiple zinc flower |  | 10 | 10 | 10 | 10 | 10 | 10 |
|  | Mixed resin (A) | 2 |  | 2 |  |  |  |  |
|  | Mixed resin (B) |  |  |  | 2 | 4 | 2 | 2 |
|  | Sulfur | 0.5 | 0.5 | 0.5 | 0.5 | 0.5 | 0.2 | 1 |
| Evaluations | Kd/Ks ratio (target value <1.6) | 1.63 X | 1.46 ○ | 1.45 ○ | 1.39 ○ | 1.51 ○ | 1.56 ○ | 1.37 ○ |
|  | t5 (minutes) (target value >14) | 15.3 ○ | 12.7 X | 15.4 ○ | 15.8 ○ | 17.0 ○ | 15.2 ○ | 14.5 ○ |

Comparative Example 1, into which zinc oxide was merely blended without blending any multiple zinc flower into this example, failed to attain the target value of the dynamic magnification. Comparative Example 2, into which no mixed resin was blended, failed to attain the target value of the working stability. In the meantime, it can be understood that in each of Examples 1 to 5, into which the multiple zinc flower and the mixed resin were blended, the vulcanized rubber attained a decrease in dynamic magnification and an improvement in working stability with a good balance. It is understood that, in particular, in Example 4, in which the sulfur blend amount was decreased into less than 0.5 part by weight for 100 parts by weight of the rubber component, the vulcanized rubber attained the decrease in dynamic magnification and the improvement in working stability with a better balance.

What is claimed is:

1. A rubber composition for vibration proof rubbers, comprising a rubber component comprising one or more diene based rubbers, a multiple zinc flower, sulfur in an amount of 0.05 parts by weight or more and 0.5 parts by weight or less, and a mixed resin, wherein the mixed resin comprises an aromatic hydrocarbon resin and an aliphatic hydrocarbon resin.

2. The rubber composition for vibration proof rubbers according to claim 1, comprising the multiple zinc flower in an amount of 2 to 40 parts by weight for 100 parts by weight of the rubber component, and the mixed resin in an amount of 0.5 to 5 parts by weight therefor.

3. The rubber composition for vibration proof rubbers according to claim 1, wherein the sulfur is in an amount of 0.05 parts by weight or more and less than 0.5 parts by weight or less.

* * * * *